United States Patent Office 3,360,505
Patented Dec. 26, 1967

3,360,505
WATER-SOLUBLE, METAL-CONTAINING AZO-DYESTUFFS CONTAINING HALOGENATED CYCLOBUTANOIC ACID AMIDE OR CYCLOBUTANE ACRYLIC ACID AMIDE GROUPS
Otto Scherer, Bad Soden, Taunus, and Klaus Uhl, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Mar. 30, 1965, Ser. No. 444,034
Claims priority, application Germany, Apr. 4, 1964, F 42,517
6 Claims. (Cl. 260—147)

ABSTRACT OF THE DISCLOSURE

Water-soluble, metal complex compounds of azo dyes having at least one sulfonic acid group and a cyclobutyl group connected to the dyestuff molecule by an
—NHCO— or —NHCO—CH=CH—
bridge useful for dyeing or printing cellulose fibers with good fastness to wet processing.

---

The present invention provides new valuable water-soluble metalliferous azo-dyestuffs and a process for preparing them; more particularly it provides the metal complex compounds of azo-dyestuffs of the general formula

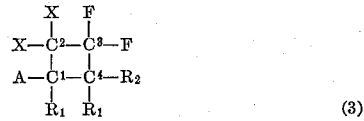
(1)

in which D represents the radical of a diazo-component, K represents the radical of a coupling component, and in which D and/or K may contain one or more groups imparting solubility in water, as for example sulfonic acid or carboxylic acid groups, and one or more azo groups, $R_1$ and $R_2$ represent hydrogen or chlorine atoms or carboxylic acid, cyano-, nitro- or sulfonic acid groups or the groupings —R′, —OR′, —COOR‴, —$SO_2$—NR′R″, —$SO_2$ R′ or —CO—NR′R″, the two substituents $R_1$ may together represent a further carbon linkage between the carbon atoms $C_1$ and $C_4$, R′ and R″ in the abovementioned groupings representing hydrogen atoms or alkyl or aryl-groups, R‴ representing an alkyl- or aryl-group, X-represents a hydrogen or halogen atom, preferably a fluorine or chlorine atom, B represents one of the groupings —CO—NR′—, —$SO_2$—NR′—, —CH=CH—CO—NR′ and —CHR′—CHR″—CONR′—, —R′ and R″ having the meanings mentioned above, $n$ represents an integer from 1 to 5 and $k$ represents 0 or 1.

It has been found that it is possible to prepare metal complex compounds of azo-dyestuffs of the general Formula 1 mentioned above, by reacting water-soluble, metalliferous azo-dyestuffs, which in their metal-free form correspond to the general formula

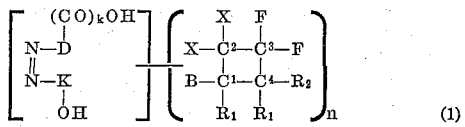
(2)

wherein D, K, R′, $n$ and $k$ have the meanings mentioned above, and the hydroxyl- and —(CO)$_k$OH-groups are in a position adjacent to the azo-group, with 1 to 5 mols of a compound of the general formula

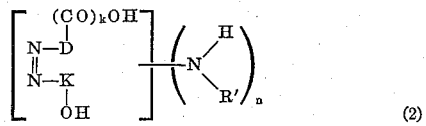
(3)

in which $R_1$, $R_2$ and X have the meaning mentioned above, and A represents one of the groupings —CO-halogen, —$SO_2$-halogen, —$CH_2$—$CH_2$—$SO_2$-halogen, —CH=CH—CO-halogen and —CHR′—CHR″—CO-halogen, at a temperature within the range from about 10° C. to about 80° C., preferably from about 10° C. to about 30° C. in an aqueous, aqueous-organic or purely organic medium, at a pH-value within the range from about 6.5 to about 10 in the presence of an acid-binding agent.

As complex-bound metals chromium, cobalt, copper and nickel may be used. As regards the ratio metal: azo dyestuff the metalliferous azo dyestuffs obtainable according to the usual manner, represent in the presence of copper or nickel 1:1 complexes, in the presence of cobalt or chromium mostly 1:2 complexes.

The following diazo components which according to the process of the present invention may be used for the preparation of the azo-dyestuffs to be reacted, are cited as examples: 1-hydroxy-2-aminobenzene-4 - sulfonic acid, 2-amino-benzoic acid, 1-hydroxy-2-amino-4-nitrobenzene, 1-hydroxy-2-amino-5-nitrobenzene, 1-hydroxy-2 - amino-4-methyl-6-nitrobenzene, 1-hydroxy-2-amino-5-methyl - 6-nitrobenzene, 1-hydroxy-2-amino-4-nitrobenzene - 6 - sulfonic acid, 1-hydroxy-2-amino-6-nitrobenzene-4 - sulfonic acid, 1-hydroxy-2-amino-6-acetylbenzene-4 - sulfonic acid, 1-hydroxy-2-amino-4-nitro-6-acetylbenzene, 1-hydroxy - 2-amino-4-chloro-6-nitrobenzene, 1-hydroxy-2-amino - 5-chloro-6-nitrobenzene, 1-hydroxy-2-amino-4, 6 - dinitrobenzene, 1-hydroxy-2-amino-4-methoxy-5 - nitrobenzene, 1-hydroxy-2-amino-benzene- 4 - sulfonic acid amide, 1-amino-2-hydroxynaphthalene-6-sulfonic acid, 1-amino-2-hydroxy-6-nitronaphthalene-4-sulfonic acid.

As examples of coupling components, which according to the process of the invention may be used for preparing azodyestuffs to be reacted, there may be mentioned 1-hydroxy-2-amino-6-acetylaminobenzene-4-sulfonic acid, 2-phenylamino-5-hydroxynaphthalene-7-sulfonic acid, 1-(3′-sulfo-phenyl)-3-methyl-5-pyrazolone, 1-(2′,5′-dichloro-4′-sulfo - phenyl) - 3 - methyl - pyrazolone, 1 - hydroxynaphthalene-4-sulfonic acid, 1-hydroxy-naphthalene-8-sulfonic acid, 1-amino-8-hydroxynaphthalene-3, 6-disulfonic acid.

Appropriate reaction components of the above-mentioned general formula (3) are for example 2.2.3.3-tetrafluorocyclobutanoic acid chloride-1, 2-chloro-2.3.3-trifluorocyclobutanoic acid chloride-1, 2.2-dichlorocyclobutanoic acid chloride-1, 1-chloro-2.2.3.3-tertafluorocyclobutanoic acid chloride-1, 1,2-dichloro-2,3,3-trifluorocyclobutanoic acid chloride-1, 1,2,2-trichloro-3,3-difluorocyclobutanoic acid chloride- 1, 2,2,3,3 - tetrafluorocyclobutene - 4 - carboxylic acid chloride-1, 2-chloro-2.3.3-trifluorocyclobutanoic acid chloride-1, 2.2.3.3-tetrafluorocyclobutane-sulfonic acid chloride-1, 1-methyl-2.2-dichloro-3.3-diflurocyclobutanoic acid chloride-1, 2.2.3.3-tetrafluoro-4.4-dimethylcyclobutanoic acid chloride-1, 2-chloro-2.3.3-trifluoro-4-phenylcyclobutanoic acid chloride-1, 3-(2′.2′.3′.3′-tetrafluorocyclobutyl)-acrylic acid chloride-1.

The compounds of the above-mentioned Formula 3 or 4 which are reacted according to the process of this invention may be prepared by reaction of unsaturated nitriles with halogenated olefines under pressure and at an elevated temperature, by subsequent saponification to halogenated cyclobutane carboxylic acids and by further reaction to carboyylic acid halides. The above-mentioned cyclobutanoic acid halides may also be prepared by reacting unsaturated carboxylic acids with halogenated olefines under the conditions described above, converting the thus obtained halogenated cyclobutanoic acids into the corresponding acid halide according to known processes, or by synthesizing directly the halides of unsaturated carboxylic acids with halogen containing olefines (U.S. Patents Nos. 2,441,128 and 2,462,345).

The reaction may be carried through not only in a purely aqueous medium but also in an aqueous-organic medium, as for example in hydrous 1.4-dioxane, acetone or ethylene glycol dimethyl ether, or in a purely organic medium, as for example, in the above-mentioned organic liquids.

When operating in aqueous or aqueous-organic media it is suitable to use as acid-binding agents hydroxides, carbonates or hydrogen carbonates of metals of the first three groups of the periodic system, preferably the sodium compounds. For purposes of the reaction in an organic medium it is preferred to use as acid-binding agents tertiary organic bases, as for example triethanol amine, dimethyl aniline, pyridine or picoline.

The reaction may also be carried out at temperatures lower or higher than mentioned above; however, when operating at lower temperatures the result is a longer reaction period and when operating at higher temperatures the result is a loss of yield. The optimum temperature to be applied in each individual case depends on the reactants used.

The dyeings of prints obtained by dyeing or printing fibrous materials of native, regenerated cellulose, as for example cotton, linen, hemp, staple fibres, rayon or native or regenerated protein fibres, as for example wool or silk, with the new dyestuffs obtainable according to the process of the invention, are distinguished by very good fastness to wet processing.

The manufacture of the dyeings is advantageously carried out by impregnating the fibrous material with the dyestuff in the presence of an agent having an alkaline reaction or by dyeing it in a dilute dye liquor. If the dyestuff has no or no pronouced affinity for the fibrous material, it is advantageous to impregnate the fibrous material in the cold or at a moderately elevated temperature with aqueous, if desired or required, salt-containing, solutions of the dyestuffs and then to squeeze off the liquid. The dyestuff solutions may contain inorganic salts, as for example alkali metal chlorides or alkali metal sulfates. As agents having an alkaline effect there are preferably used inorganic compounds, as for example, alkali or alkaline earth metal hydroxides, alkali metal bicarbonates, alkali metal carbonates, alkali metal phosphates, as for exmple trisodium phosphate or mixtures of disodium phosphate and trisodium phosphate, alkali metal borates or alkali metal salts of trichloro acetic acid or mixtures of the above-mentioned agents having an alkaline reaction. The inorganic compound may, for example, be replaced by trichloro acetic sodium.

The dyestuffs which have been applied to the fibrous material in the manner described above, are fixed after the impregnation. The impregnated material is subjected to a heat treatment, if desired or required after an intermediate drying.

The heat treatment is carried out by steaming the material in a current of hot air or in an organic solvent. When for example alkali metal hydroxides are used the fixation may be brought about already by abandoning the impregnated material for several hours in the cold or at a moderately elevated temperature.

When impregnation baths are used, which do not contain an agent having an alkaline reaction, it is advantageous to introduce the impregnated material into a salt-containing alkaline metal bath and then to subject it to a heat treatment. An appropriate combination of temperature and pH-value and an appropriate choice of the alkalis enable the fixation of the dyestuffs to be carried out even during the dyeing process.

The dyestuffs obtained according to this invention may also be applied to the fibrous material by a textile printing process. For the purpose of preparing the printing colours the dyestuffs are dissolved in water, in the presence of dispersion agents, if required or desired, while usual auxiliary agents, as for example hygroscopic substances or solution promoters such as urea, acetamide or dimethyl-sulfoxide, are added, the whole is then mixed by stirring with thickening agents as for example methyl cellulose, starch ether alginates or emulsion thickenings (oil-in-water or water-in-oil which may contain other thickenings). To the pastes thus obtained the alkalis described above are added and the material is printed in the usual way. The fixation is then brought about by a heat treatment by means of steam, carried out, for example, for 5 to 10 minutes at a temperature within the range from 101° to 105° C. or for about 30 seconds to 1 minute at a temperature within the range from 145° C. to 150° C. or for several minutes by a dry heat treatment for example at a temperature within the range of from 120° C. to 150° C., or for about 30 seconds to 1 minute at a temperature within the range of from 190° C. to 220° C.

The above-mentioned temperatures and fixation periods may be modified according to the nature and quantity of the alkalis used.

It is also possible to print the fibrous material with practically neutral, or even weakly acid printing pastes which do not contain any agent having an alkaline reaction. In this case the fibrous material has to be prepared either before or after the printing operation with agents having an alkaline reaction. The fixation of the dyestuff is likewise brought about by a treatment with steam or by the action of heat, the periods of fixation and the temperatures depending on the nature and quantity of the alkalis used.

The fixation may also be brought about without steaming by passing the material for a short period of time through a hot, salt-containing, alkaline solution.

The following examples serve to illustrate the invention but they are not intended to limit it thereto, the parts being by weight unless otherwise stated and the relationship of parts by weight to parts by volume being that of the kilogram to the liter.

*Example 1*

From 94.4 parts of the dyestuff obtained by coupling diazotized 6-acetylamino-2-aminophenol-4-sulfonic acid with 2-phenylamino - 5 - hydroxynaphthalene-7-sulfonic acid, the acetyl group is split off by heating with 200 parts of a 4% sodium hydroxide solution at a temperature within the range of from 90 to 95° C. and the free amino compound is isolated with hydrochloric acid. 43 parts of the dyestuff thus obtained are neutralized with 2 N caustic soda solution and boiled under reflux for about 3 hours with 10 parts of 10 N sodium hydroxide solution and with an aqueous salicylic chromium solution containing 2.8 parts of chromium, cooled down to room temperature and adjusted by means of hydrochloric acid of 20% strength to a pH-value within the range of from 7.5 to 8. Now 19.05 parts of 2.2.3.3-tetrafluorocyclobutanoic acid chloride-1 dissolved in 50 ml. of acetone and 2 N sodium hydroxide solution are added dropwise simultaneously that the pH-value remains within the range of from 7.5 to 8. When the reaction has ceased the mixture is acidified with a small quantity of glacial acetic acid until its pH-value is within the range of from 4 to 5. By salting out with sodium chloride the 1.2 chromium complex of the dyestuff of the formula

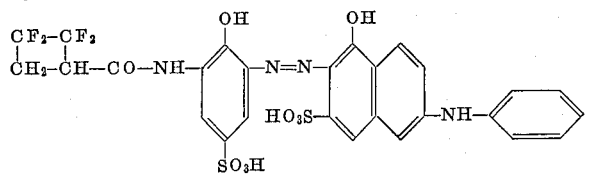

is obtained.

A cotton fabric is impregnated with a solution containing in one litre of water 40 parts of dyestuff, 20 parts of soda ash and 100 parts of urea, squeezed off between a pair of rollers to keep the weight of the adhering liquor at 70% of the dry cotton fabric, and dried on an appropriate drying set at 80° C. Now the dried material is steamed in a steamer for 5 minutes at a temperature of 102° C., rinsed out in hot water and dried. A blue dyeing of good fastness to wetting is obtained.

*Example 2*

44 parts of the dyestuff of the formula

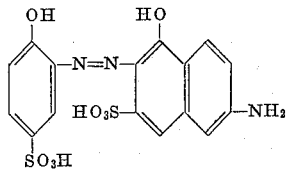

are adjusted with 2 N-sodium carbonate solution to the pH-value 8 and converted in the manner described in Example 1 into the 1:2 chromium complex; after having adjusted the pH-value to a range of from 7.5 to 8 by means of hydrochloric acid of 20% strength 20.7 parts of 2-chloro-2.3.3-trifluorocyclobutanoic acid chloride-1 are added dropwise at room temperature to the above-mentioned solution. The pH-value is maintained within the range of from 7.5 to 8 by adding simultaneously 2 N sodium carbonate solution. By subsequently acidifying and salting out with sodium chloride, the 1:2 chromium complex of the dyestuff of the formula

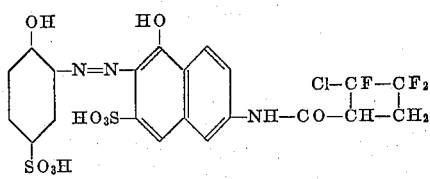

is obtained.

100 parts of a yarn of viscous staple fibre are dyed at 40° C. in 1500 parts of an aqueous liquor containing 45 parts of $Na_3PO_4 \cdot 12H_2O$, 75 parts of sodium sulfite and 20 parts of the above-mentioned dyestuff. A reddish brown tint of good fastness to wetting is obtained.

*Example 3*

43.2 parts of the dyestuff of the formula

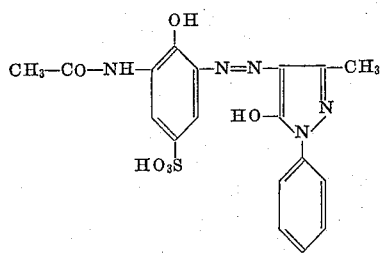

are de-acetilized in the manner described in Example 1, mixed with a solution of 15.5 parts of cobalt sulfate ($CoSO_4 \cdot 7H_2O$) in 100 parts by volume of water, heated for about 30 minutes to 75–80° C., cooled down to room temperature and finally adjusted to a pH-value of 7.5 by means of a 20% hydrochloric acid. Now 23.5 parts of 2,2- dichloro-3,3-difluorocyclobutanoic acid chloride-1 and sodium bicarbonate solution of about 10% strength are added simultaneously dropwise in such a manner that the pH-value remains within the range of from 7.0 to 7.5. The solution is subsequently acidified with glacial acetic acid to keep the pH-value within the range of from 4 to 5. The result is the 1:2 cobalt complex of the dyestuff of the formula

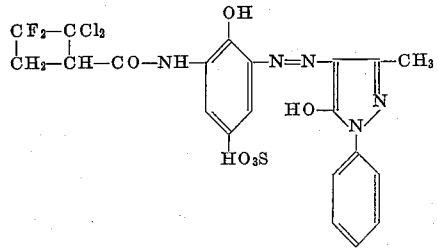

When a urea-containing printing paste is used, which contains sodium carbonate as alkali, the print on the cotton fabric after the fixation of the above-mentioned dyestuff in a continuous-steamer (Mather-Platt) develops a violettish brown tint of a good fastness to wetting.

*Example 4*

57.5 parts of the azo-dyestuff obtained by coupling diazotized 1-hydroxy-2-amino-5-nitrobenzene with 2-amino-5-hydroxynaphthalene-7-sulfonic acid are dissolved in 500 parts by volume of water and mixed with 100 parts by volume of 2 N caustic soda solution and a solution of 15.5 parts of cobalt sulfate ($CoSO_4 \cdot 7H_2O$) in 100 parts by volume of water. The mixture is then heated for about half an hour to a temperature within the range of from 70 to 80° C., cooled down to room temperature, adjusted to pH 8 by means of 20% hydrochloric acid and mixed with 22.5 parts of 1-chloro-2.2.3.3-tetrafluorocyclobutanoic acid chloride and 2 N sodium carbonate solution simultaneously, that the pH-value is maintained within the range of 7.5–8. After salting out with sodium chloride there is obtained the 1:2 cobalt complex of the dyestuff of the formula

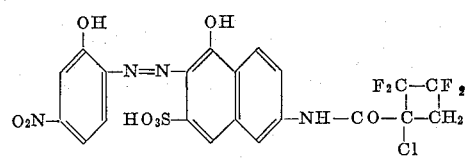

When the above-mentioned dyestuff is printed in the presence of an alkali on cotton fabric thermofixed under the usual conditions and treated as usual, a blue print of an excellent fastness to wetting is obtained.

*Example 5*

54.3 parts of the monoazo-dyestuff obtained by coupling diazotized 1-hydroxy-2-amino - 5 - nitrobenzene with 2-phenylamino-8-hydroxynaphthalene - 3,6 - disulfonic acid, are dissolved in 800 parts by volume of water and, at a temperature of 40° C. 8 parts of sodium hydrogen sulfide are added, then the whole is stirred for about 2 hours at a temperature within the range of 40–50° C. After neutralizing with hydrochloric acid of 10% strength, the dyestuff thus obtained of the formula

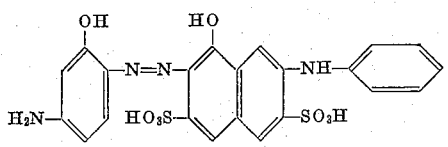

is isolated by filtration.

53 parts of the azo-dyestuff described above are dissolved in 1000 parts by volume of water and 50 parts by volume of 2 N sodium carbonate solution and mixed with 120 parts of a solution containing 2.6% by weight of chromium in the form of chromium salicylate; then the whole is heated under reflux for about 4 hours. After cooling down the pH-value is adjusted to 7.5 by means of hydrochloric acid of 20% strength and 24.1 parts of 1.2-dichloro - 2.3.3 - trifluorocyclobutanoic acid chloride-1 are added while the pH-value of 7.5 is maintained by adding drop by drop 2 N sodium hydroxide solution. Then the pH-value is adjusted to 4–5 by acidifying with a small quantity of glacial acetic acid and the 1:2 metal complex of the dyestuff of the formula

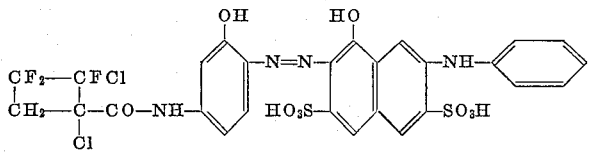

is precipitated with sodium chloride.

When a neutral printing paste has been printed on a cotton fabric, the printed fabric is passed at room temperature through an alkaline salt-containing padding bath containing sodium hydroxide solution, sodium carbonate, potassium carbonate and sodium chloride, the above-mentioned dyestuff is fixed by passing it through a two-phase steamer. A reddish grey print of a good fastness to wetting is obtained.

Example 6

53.4 parts of the azo-dyestuff obtained by coupling diazotized 1-amino-2-hydroxy-6-nitronaphthalene-4-sulfonic acid with 2-amino-5-hydroxy-naphthalene-7-sulfonic acid in an alkaline medium are dissolved in 3000 parts by volume of water. To the thus obtained solution 10 parts of normal sodium hydroxide solution and 120 parts of an aqueous solution containing 2.6% of chromium in form of chromium salicylate are added, the whole is heated to the boil under reflux for about 3 to 4 hours and the pH-value is adjusted to 7.5 by means of 10% hydrochloric acid. Then 25.8 parts by weight of 1.2.2-trichloro-3.3-difluorocyclobutanoic acid chloride-1 dissolved in 50 parts by volume of acetone and 2 N sodium hydroxide solution are added simultaneously drop by drop to maintain the pH-value at 7.5. After having adjusted the pH-value to 5 by means of a small quantity of glacial acetic acid and after having evaporated in a vacuum to dryness, the 1:2 chromium complex of the dyestuff of the formula

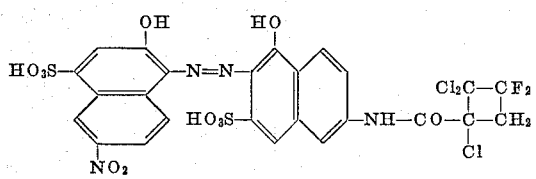

is obtained.

When the dyestuff described above is printed on a linen fabric in the presence of sodium carbonate and fixed by steaming in a continuous-steamer under the usual conditions, the result is a grey print of a very good fastness to wetting.

Example 7

25.1 parts of 2-amino-5-hydroxynaphthalene-7-sulfonic acid of 94.1% strength are coupled in the usual manner with 13.7 parts of diazotized 2-aminobenzene-1-carboxylic acid. The solution thus obtained is stirred for 10 hours at room temperature after 28.6 parts of crystallized copper sulfate (CuSO$_4$·7H$_2$O) and 40 parts of crystallized sodium acetate have been added. 22.6 parts of 1 - chloro - 2.2.3.3 - tetrafluorocyclobutanoic acid chloride-1 dissolved in 50 ml. of acetone are added dropwise while the pH-value is maintained within the range of 6.5–7 by adding simultaneously a sodium hydroxide solution of 10% strength. After salting out with sodium chloride the 1:1 copper complex of the dyestuff of the formula

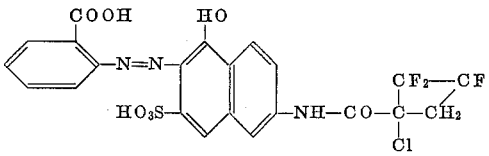

exhibits brownish-red prints of a good fastness to wetting.

Example 8

35.8 parts of the azo-dyestuff of the formula

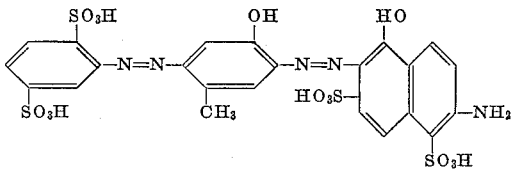

are dissolved in 150 parts by volume of water, 28.1 parts of nickel sulfate (NiSO$_4$·7H$_2$O) and 40 parts of sodium acetate are added; the whole is heated for 4 hours to 80–90° C., and cooled down to room temperature. 10.2 parts of 1-methyl - 2.2.3.3 - tetrafluorocyclobutanoic acid chloride-1 are added drop by drop and the solution is stirred for 2 hours; the nickel complex of the dyestuff of the formula

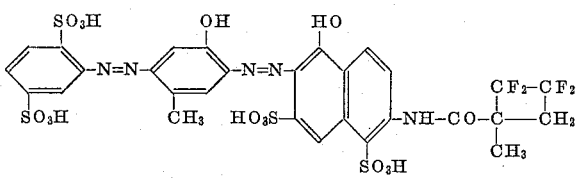

is finally salted out with sodium chloride. From an alkaline solution the above-mentioned dyestuff produces on viscous silk a blue print of a good fastness to wetting.

Example 9

25.1 parts of 2-amino-5-hydroxynaphthalene-7-sulfonic acid of 94.1% strength are coupled in the usual manner with 13.7 parts of diazotized 2-aminobenzene-1-carboxylic acid and heated to the boil under reflux for 3 hours with 10 parts of 10 N sodium hydroxide solution and an aqueous solution of chromium salicylate containing 2.8 parts of chromium. The whole is cooled down to room temperature, acidified carefully with hydrochloric acid of the density 1.16 until the pH-value of 6 to 7 is reached, acylated subsequently at a temperature of 10–12° C., with 22 parts of 3-(2'.2'.3'.3'-tetrafluorocyclobutyl-)acrylic acid chloride dissolved in 50 parts by volume of acetone. The hydrochloric acid freed during this process is neutralized by adding dropwise 2 N sodium hydroxide solution to maintain the pH-value at 6.5–7.5. When the reaction has ceased, the whole is acidified with a small quantity of hydrochloric acid of the density 1.16 to obtain a pH-value of 4–5, then the 1:2 chromium complex of the dyestuff of the formula

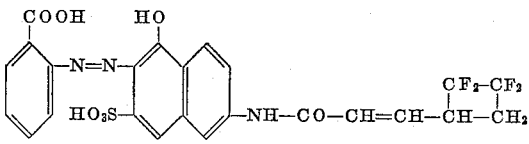

is salted out with 10 parts of sodium chloride per 1000 parts by volume of the dyestuff solution. The prints of the dyestuff on cotton develop in the presence of an alkali a reddish brown tint of an excellent fastness to wetting.

Example 10

To 80 parts of the dyestuff which in its free acid form corresponds to the formula

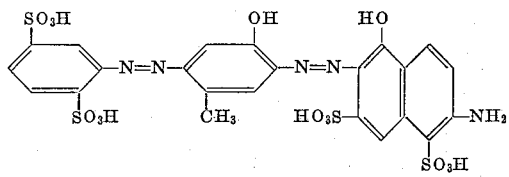

are added 40 parts of anhydrous sodium acetate and a saturated solution of 28.6 parts of $CuSO_4 \cdot 7H_2O$, and while stirring for 15 hours at room temperature the whole is converted to the 1:1 copper complex. By means of 2 N potassium hydroxide solution the pH-value is adjusted to 6.5, then 22 parts of 3-(2'.2'.3'.3'-tetrafluorocyclobutyl-)-acrylic acid chloride dissolved in 50 parts by volume of dioxane, are added drop by drop at room temperature and by adding more quantities of 2 N potassium hydroxide solution the pH-value is maintained at 6.5 to 7.5. After having stirred for 2 hours, the whole is salted out with 150 parts of potassium chloride per 1000 parts by volume of the solution; the 1:1 copper complex of the dyestuff of the formula

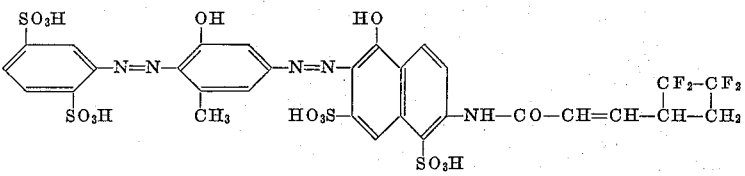

is obtained which when printed on a cellulose material in the presence of an alkali, develops a blue print of a good fastness to wetting.

Example 11

22.1 parts of 2-aminophenol-4-sulfonic acid are diazotized in the usual manner and coupled with 25.1 parts of 2-amino-5-hydroxynaphthalene-7-sulfonic acid of 94% strength. 40 parts of water-free sodium acetate and 28.6 parts of $CuSO_4 \cdot 7H_2O$ in the form of its saturated aqueous solution are added, then the whole is stirred for 24 hours at room temperature, sodium bicarbonate solution of 9% is added in such a manner that the pH-value is increased to 7, and then the solution is acylated at a temperature ranging from 35–40° C. with 23.5 parts of 3-(2'.2'.3'.3'-tetrafluorocyclobutyl-) acrylic acid chloride dissolved in 50 parts by volume of acetone. By a further addition of the above-mentioned sodium bicarbonate solution the pH-value is maintained within a range of 6.5 to 7. After stirring for 2 hours the 1:1 copper complex of the dyestuff, which in its free acid corresponds to the formula

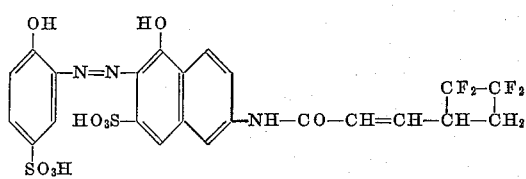

is salted out with 200 parts of sodium chloride per 1000 parts by volume of the reaction solution. When printed on viscous silk, the dyestuff develops a ruby-red tint of an excellent fastness to washing.

Example 12

50 parts of the dyestuff corresponding in its free acid form to the formula

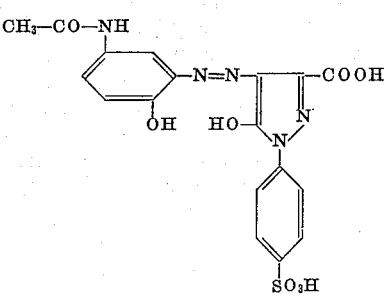

are de-acetylated in the usual manner by boiling with aqueous sodium hydroxide solution of 20% strength, the pH-value is subsequently adjusted to 6.5 by means of hydrochloric acid of the density 1.16; then 40 g. of solid, anhydrous sodium acetate and a saturated, aqueous solution of 28.6 parts by weight of $CuSO_4 \cdot 7H_2O$ are added and the whole is stirred for 10 hours at room temperature. After having heated to a tempertaure within the range of 50–55° C. 23 parts of 3-(2'.2'.3'.3'-tetrafluorocyclobutyl-) acrylic acid chloride dissolved in 50 parts by volume of acetone, and 2 N sodium carbonate solution are added simultaneously, drop by drop, to keep the pH-value within the range of 6.5 to 7.5. When the reaction has ceased the whole is salted out with 100 parts of sodium chloride per 1000 parts by volume of the solution and a dyestuff of the formula

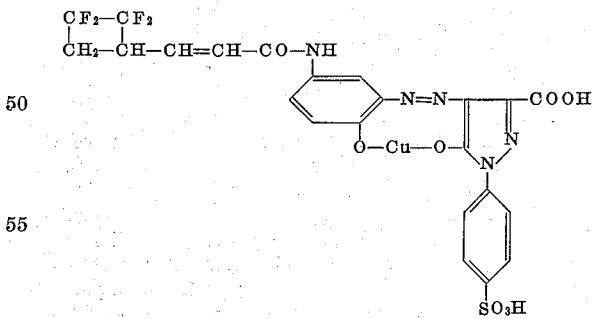

is obtained. On cotton fabric in the presence of an alkali it produces a brown dyeing of good fastness to washing.

Example 13

50 parts of the dyestuff of the formula

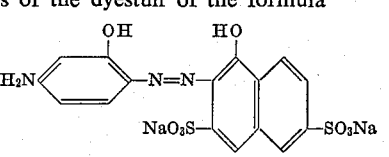

obtained by coupling diazotized 2-amino-5-acetyl-aminophenol with 1-hydroxynaphthalene-3,6,-disulfonic acid and by de-acetylating with aqueous sodium hydroxide solution, are dissolved in 1500 parts by volume of water with 10 parts by volume of 10 N sodium hydroxide solution, chromium salicylate solution containing 2.8 parts of chromium are added, the whole is heated to the boil under reflux for 3 hours. Now hydrochloric acid of the density 1.16 is added until a pH-value of 7.5 is reached and the whole is cooled down to 60–65° C. 22 parts of 3-(2′.2′.3′.3′-tetrafluorocyclobutyl-)acrylic acid chloride dissolved in 50 parts by volume of dioxane and potassium carbonate solution of 20% strength are added simultaneously drop by drop to keep the pH-value within a range of 7.5 to 8. Then the whole is salted out with 200 parts by weight of sodium chloride per 1000 parts by volume of the solution. The 1:2 chromium complex of the dyestuff of the formula

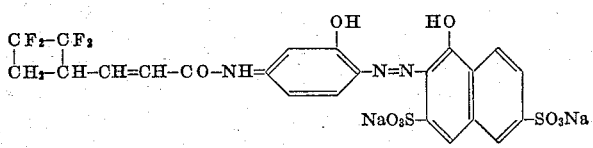

is obtained, which on cotton fabric in the presence of an alkali produces a bluish red dyeing of an excellent fastness to washing.

We claim:

1. The water-soluble complex metal compound containing a metal selected from the group consisting of nickel, copper, cobalt and chromium of an azo-dyestuff of the formula

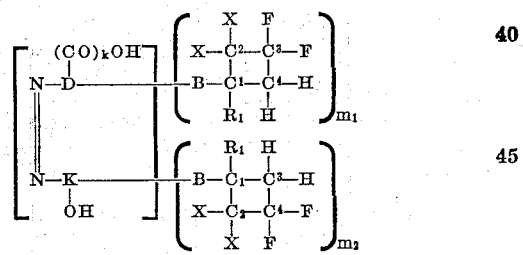

wherein D represents the radical of a diazo compound selected from the group consisting of radicals of the benzene and naphthalene series, K represents the radical of a coupling component selected from the group consisting of radicals of the benzene, naphthalene and pyrazolone series, at least one of D and K containing at least one sulfonic acid group, X represents a member selected from the group consisting of chlorine and fluorine, $R_1$ represents a member selected from the group consisting of hydrogen, chlorine and lower alkyl, B represents —NH—CO— or —NH—CO—CH=CH—, $k$ represents an integer from 0 to 1, and $m_1$ and $m_2$ represent integers from 0 to 1, the sum of $m_1$, $m_2$ being 1.

2. The 1:2 chromium complex compound of the dyestuff of the formula

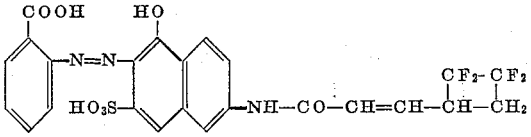

3. The 1:1 copper complex compound of the dyestuff of the formula

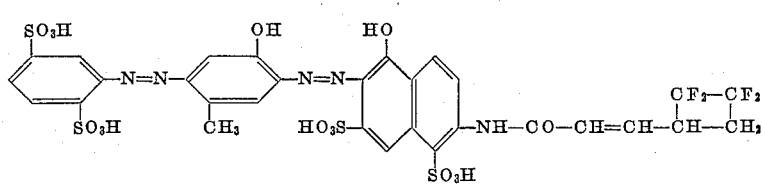

4. The 1:1 copper complex compound of the dyestuff of the formula

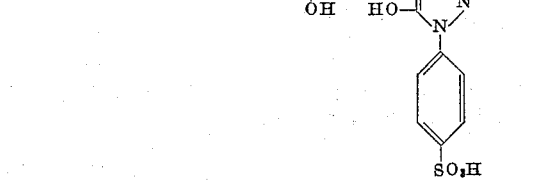

5. The 1:1 copper complex compound of the dyestuff of the formula

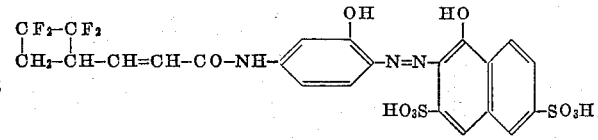

6. The 1:2 chromium complex of the dyestuff of the formula

No references cited.

FLOYD D. HIGEL, Primary Examiner.